(12) United States Patent
Wang et al.

(10) Patent No.: US 8,346,317 B2
(45) Date of Patent: Jan. 1, 2013

(54) ELECTRONIC DEVICE HAVING ROTARY INPUT MEMBERS

(75) Inventors: Ting-Kai Wang, Taipei Hsien (TW); Jing-Jing Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 272 days.

(21) Appl. No.: 12/952,213

(22) Filed: Nov. 23, 2010

(65) Prior Publication Data

US 2012/0040713 A1    Feb. 16, 2012

(30) Foreign Application Priority Data

Aug. 13, 2010 (CN) .......................... 2010 1 0252997

(51) Int. Cl.
*H04M 1/00* (2006.01)

(52) U.S. Cl. ................. 455/575.1; 455/90.2; 455/575.2; 455/575.3; 455/575.4; 455/575.8; 455/90.3; 455/550.1; 455/184; 455/575.7; 713/330; 370/352

(58) Field of Classification Search ............... 455/550.1, 455/66.1, 551, 575.1, 575.8, 575.5, 90.2, 455/90.3, 575.3, 757.8, 184, 575.2, 575.4, 455/381; 370/352; 345/184; 713/330
See application file for complete search history.

*Primary Examiner* — Patrick Edouard
*Assistant Examiner* — Fred Casca
(74) *Attorney, Agent, or Firm* — Altis Law Group, Inc.

(57) ABSTRACT

The present disclosure provides an electronic device having rotary input members. The device includes a substantially cylindrical main body, at least one hollow rotary input member rotatably connected to the main body, at least one pair of pads including two pads spaced from each other, arranged on the main body and beneath the at least one rotary input member, at least one selection contact arranged on an internal surface of the at least one rotary input member, and a processing unit. When a closed loop includes a pair of pads, a selection contact and the processing unit is formed, the processing unit determines input characters according to a relationship table.

10 Claims, 3 Drawing Sheets

ELECTRONIC DEVICE HAVING ROTARY INPUT MEMBERS

BACKGROUND

1. Technical Field

The present disclosure relates to an electronic device having rotary input members.

2. Description of Related Art

In general, an electronic device such as a mobile phone has the numbers 0-9 and the symbols * and # on a keypad. In addition to the numbers, there are also letters on the keypad to enable the input of numbers and letters. However, for electronic devices having special shape, such as pen shape, such type of keypad is not suitable.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation. It should be noted that references to "an" or "one" embodiment in this disclosure are not necessarily to the same embodiment, and such references mean at least one.

Figure 1:
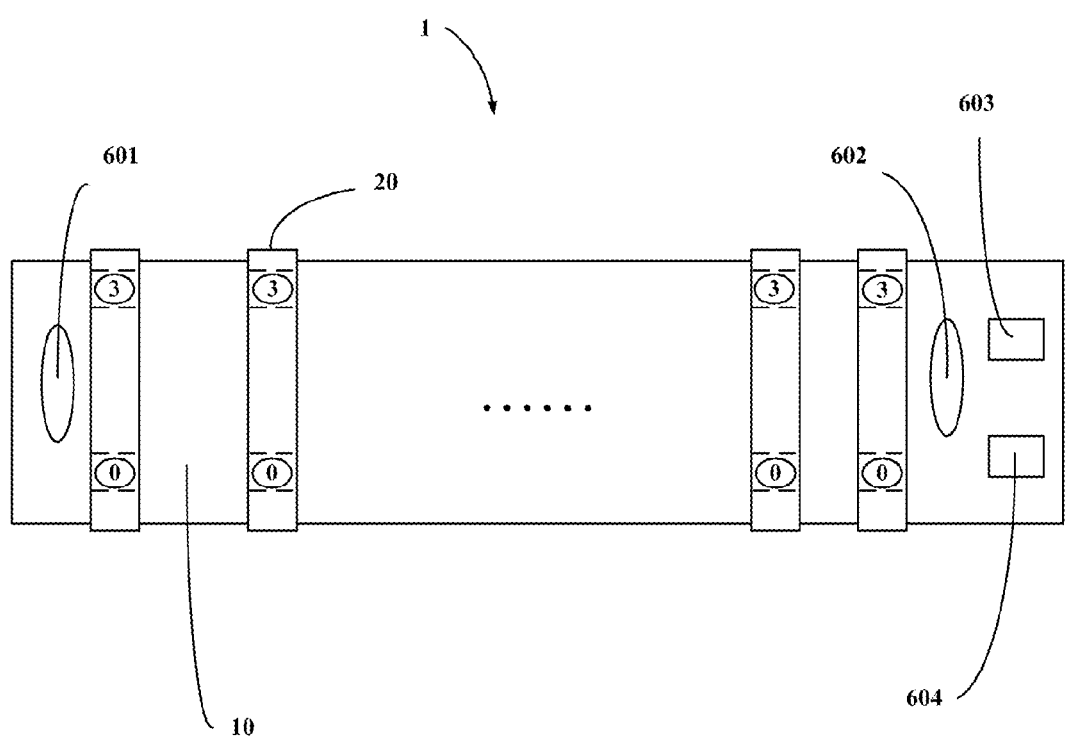
FIG. 1 is a schematic view of an electronic device having rotary input members in accordance with an exemplary embodiment.

Referring to FIG. 1, an electronic device 1 includes a main body 10 and at least one rotary input member 20. The main body 10 is substantially cylindrical, and the rotary input member 20 is a ring. The inner diameter of the rotary input member 20 matches the outer diameter of the main body 10, to allow the rotary input member 20 to rotatably connect to the main body 10. The rotary input member 20 is made of insulated material, such as plastic, and each rotary input member 20 can be used to input one or more characters.

Figure 2:
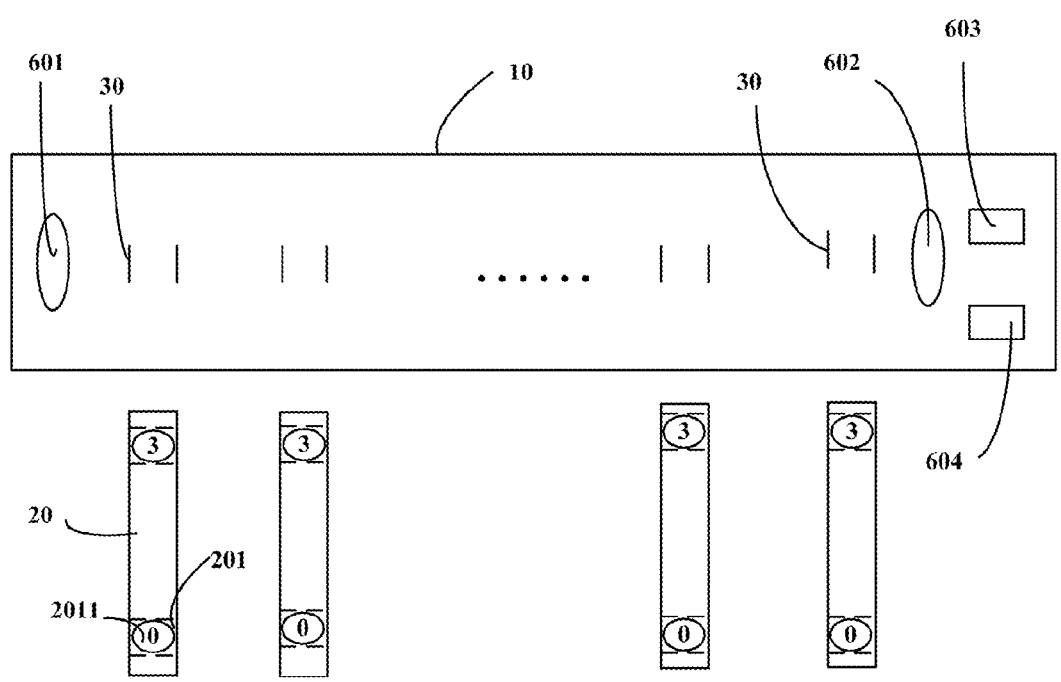
FIG. 2 is a schematic, exploded view of the electronic device of FIG. 1.

Referring to FIG. 2, the device 1 includes at least one pair of conductive contacts 30 arranged on the main body 10. Each pair of contacts 30 corresponds to and is arranged beneath one rotary input member 20. The pair of contacts 30 is made of conductive material, such as iron or copper, and includes two contacts that are spaced from each other. At least one selection contact 201 is arranged on the internal surface of each rotary input member 20. The width of the selection contact 201 is slightly greater than or the same as the distance between the two contacts of the pair of contacts 30. If more than one selection contact 201 is arranged on each rotary input member 20, the distance between every two adjacent selection contacts 201 is greater than the length of the pair of pads 30, so that the pair of pads 30 can contact no more than one selection contact 201 each time.

In the embodiment, the number of the selection contacts 201 on each rotary input member 20 is ten, and the resistance value of each selection contact 201 is different from each other. Ten different signs 2011 corresponding to the ten selection contacts 201 are set on the external surface of each rotary input member 20. The signs 2011 are used for indicating which characters are to be inputted.

Figure 3:
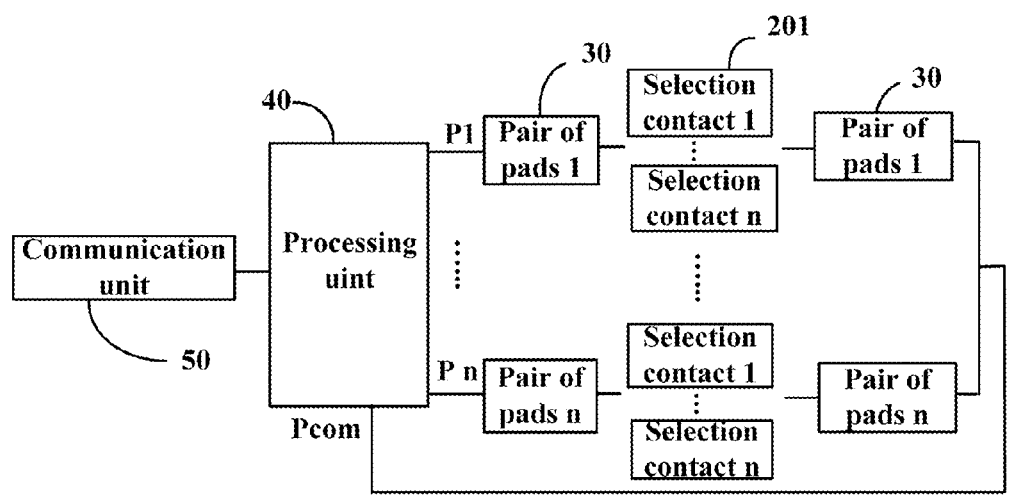
FIG. 3 is a schematic view showing electrical connection of the components of the electronic device of FIG. 1.

Referring to FIG. 3, the device 1 further includes a processing unit 40 and a communication unit 50 arranged within the main body 10. The processing unit 40 includes a common pin Pcom and at least one connection pin Pn. One pad of each pair of pads 30 is electrically connected to a corresponding pin Pn, and the other pad of each pair of pads 30 is electrically connected to the common pin Pcom. A closed loop including a pair of pads 30, a selection contact 201 and the processing unit 40 is formed when the selection contact 201 contacts one pair of pads 30.

The processing unit 40 identifies the at least one connection pin Pn and thus identifies the corresponding rotary input member 20 by the input signal from the at least one pin Pn. Because the selection contacts 201 on each rotary input member 20 have different resistance values, different currents flow through the processing unit 40 when different selection contacts 201 contact the corresponding pair of pads 30. The processing unit 40 accordingly identifies what character one rotary input member 20 at a specific position inputs, according to a relationship table below describing relationships among the at least one connection pin Pn, the at least one rotary input member 20, the different currents, and input characters.

| Connection pin | Rotary input member | Current value | Input character |
|---|---|---|---|
| P1 | Rotary input member 1 | I 1 | 1 |
|  |  | ... | ... |
|  |  | I n | n |
| ■ | ■ | ■ | ■ |
| ■ | ■ | ■ | ■ |
| ■ | ■ | ■ | ■ |
| Pn | Rotary input member n | I n1 | 1 |
|  |  | ... | ... |
|  |  | I nn | n |

The communication unit 50 is controlled by the processing unit 40 to transmit the characters inputted by the rotary input members 20 to a receiving device.

Referring to FIG. 1 again, in the embodiment, the device 1 is used as a communication device, such as a mobile phone, and the characters are sent to a base station to connect to another communication device. The device 1 includes twelve rotary input members 20, and further includes a voice input unit 601, a voice output unit 602, a YES key 603, and a NO key 604 respectively electrically connected to the processing unit 40. The voice input unit 601 is used to input audio information the device 1 is desired to transmit. The voice output unit 602 is used to put out audio information the device 1 received. The YES key 603 is used to accept the present action. The No key 604 is used to cancel the present action.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device having rotary input members, comprising:
   a substantially cylindrical main body;
   at least one hollow rotary input member rotatably connected to the main body;

at least one pair of pads arranged on the main body and beneath the at least one rotary input member, each of the at least one pair of pads comprising two pads spaced from each other;

at least one selection contact arranged on an internal surface of each of the at least one rotary input member; and a processing unit comprising a common pin and at least one connection pin, one pad of each of the at least one pair of pads being electrically connected to one of the at least one connection pin, the other one pad of the at least one pair of pads being electrically connected to the common pin, and when a closed loop comprising a pair of pads, a selection contact and the processing unit is formed, the processing unit determining the characters according to a relationship table describing the relationship among the at least one connection pin, the at least one rotary input member, different currents, and input characters.

2. The electronic device according to claim 1, wherein an inner diameter of the rotary input member matches an outer diameter of the main body.

3. The electronic device according to claim 1, wherein resistance values of the selection contacts are different from each other when the number of selection contacts on each rotary input member are at least two.

4. The electronic device according to claim 1, wherein the number of the rotary input member is twelve, and each rotary input member comprises ten selection contacts.

5. The electronic device according to claim 1, wherein at least one sign corresponding to each of the at least one selection contact is set on the external surface of each rotary input member.

6. The electronic device according to claim 1, further comprising a voice input unit, a voice output unit, a YES key and a NO key electrically connected to the processing unit respectively, which are used to input audio information the device desired to transmit, put out audio information the device received, accept the present action and cancel the present action.

7. The electronic device according to claim 1, wherein the at least one hollow rotary input member is made of insulated material.

8. The electronic device according to claim 7, wherein the insulated material is plastic.

9. The electronic device according to claim 1, wherein the at least one pair of pads is made of iron or copper.

10. The electronic device according to claim 6, wherein the device is a mobile phone.

* * * * *